United States Patent
Seymour

(10) Patent No.: US 6,467,589 B2
(45) Date of Patent: Oct. 22, 2002

(54) DISK-BRAKING DEVICE

(76) Inventor: Robert J. Seymour, 87 Bunbury Way, Epsom Downs, Epsom, Surrey (GB), KT17 4JP ( * ) Notice: Subject to any disclaimer, the term of this patent is extended or adjusted under 35 U.S.C. 154(b) by 0 days.

(21) Appl. No.: 09/962,097

(22) Filed: Sep. 26, 2001

(65) Prior Publication Data
US 2002/0040832 A1 Apr. 11, 2002

(30) Foreign Application Priority Data
Oct. 2, 2000 (TW) .................................. 89217051 U

(51) Int. Cl.$^7$ ............................................. F16D 65/10
(52) U.S. Cl. ............................... 188/218 XL; 188/26
(58) Field of Search ................................ 188/18 A, 26, 188/218 A, 218 XL, 264 A, 264 AA

(56) References Cited

U.S. PATENT DOCUMENTS

| | | | | |
|---|---|---|---|---|
| 5,454,454 A | * | 10/1995 | Easton et al. .............. | 188/71.5 |
| 5,901,818 A | * | 5/1999 | Martino ................ | 188/218 XL |
| 5,950,772 A | * | 9/1999 | Buckley et al. ............... | 188/26 |
| 6,135,248 A | * | 10/2000 | Johnson et al. ....... | 188/218 XL |
| 6,145,636 A | * | 11/2000 | Ikari et al. ............ | 188/218 XL |
| 6,148,964 A | * | 11/2000 | Huang ......................... | 188/26 |
| 6,164,421 A | * | 12/2000 | Nakamura et al. ......... | 188/71.5 |
| 6,170,620 B1 | * | 1/2001 | Akita et al. ............. | 188/251 A |

* cited by examiner

*Primary Examiner*—Christopher P. Schwartz
(74) *Attorney, Agent, or Firm*—Troxell Law Office PLLC

(57) ABSTRACT

A disk-braking device comprises a disk-braking piece, a brake, and a pair of friction pads installed in the brake and having a predetermined area. The two friction pads can clamp or release the disk-braking piece for rubbing the disk-braking piece to reduce the rotary speed or stop the rotation of the disk-braking piece. The disk-braking piece are piece-like bodies. The portion of the disk-braking piece passing through the two friction pads is formed with a plurality of openings having a predetermined shape and spaced with a predetermined distance. The arrangement of the openings is periodic. Openings at the same period have different areas. The area of each opening is smaller than that of the two friction pads. As the car brakes, a periodic variation of the friction torque generates to prevent the wheels from sliding. Therefore, a preferred braking effect is presented.

5 Claims, 3 Drawing Sheets

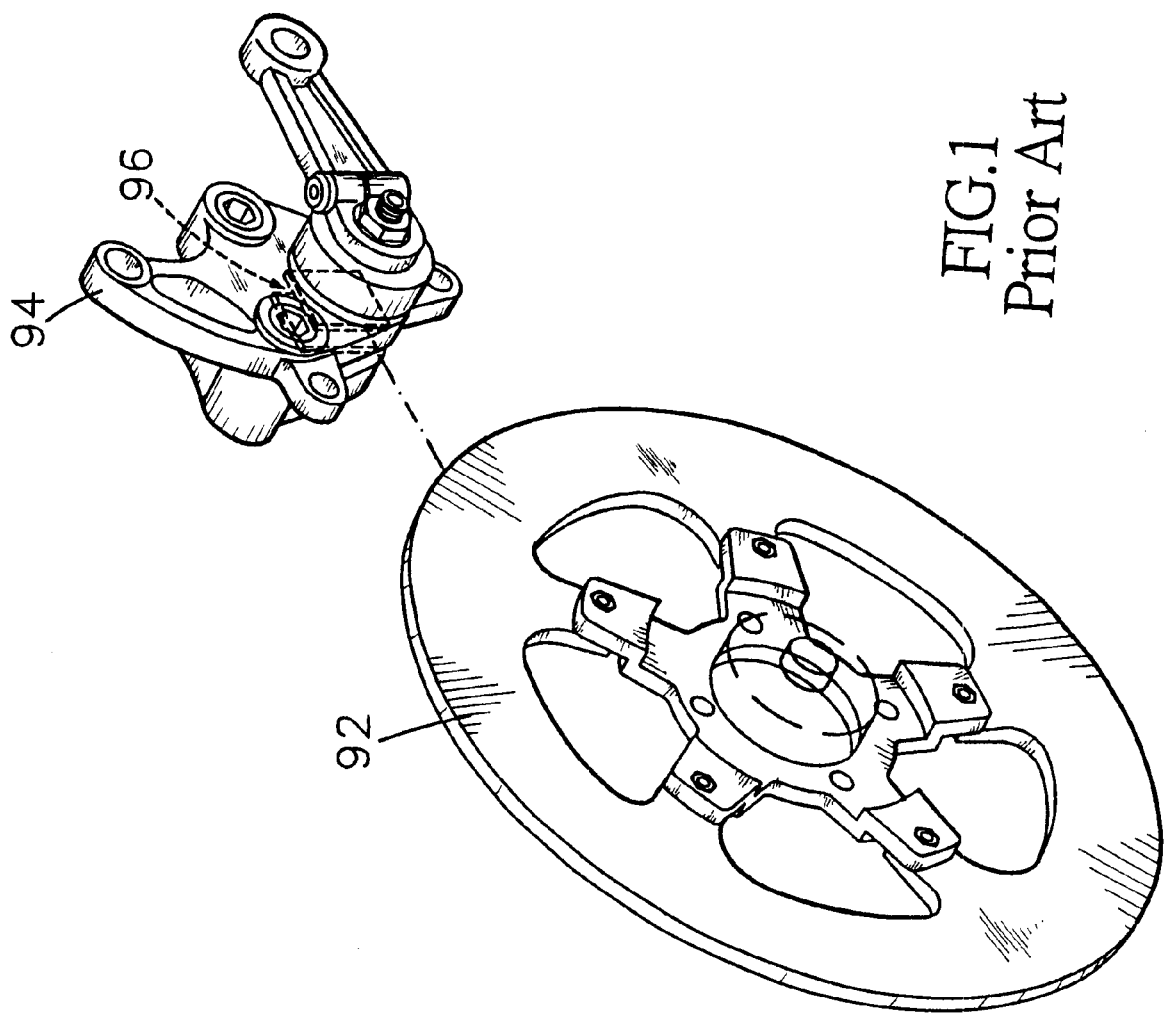

DISK-BRAKING DEVICE

FIELD OF THE INVENTION

The present invention relates to a disk-braking device, and particularly to a disk-braking piece used in cars, motorcycles or bicycles.

BACKGROUND OF THE INVENTION

Referring to FIG. 1, the prior disk-braking device comprises a round disk-braking device 92 which is coaxially installed to a wheel shaft, a brake 94 and friction pads 96 installed in the brake 94. The brake 94 is firmly secured to a car body and is adjacent to the disk-braking piece 92. The two friction pads can clamp or release the disk-braking piece 92 for rubbing the disk-braking piece to reduce the rotary speed or stop the rotation of the disk-braking piece 92.

Since in braking, a very large amount of heat generates, a plurality of identical openings are distributed in the disk-braking piece to have a preferred heat dissipating effect to avoid high temperature to affect the braking function.

In braking, especially emergency braking, it is often that the brake is locked, namely, the wheels slide so as not to control the car body. Therefore, an anti-lock barking system (ABS) is invented. That is, a sensor is installed in a brake, so, when the wheels slide in braking, during a predetermined time, friction pads may clamp and release the wheel continuously to prevent the wheel from sliding.

The ABS is very expensive and has complicated parts, and therefore, it is more suitable in cars instead of motorcycles or bicycles. Not only the mounting work is complicated, but also the cost is high. Therefore, it can be said that ABS is completely unsuitable to motorcycles and bicycles.

SUMMARY OF THE INVENTION

Accordingly, the primary object of the present invention is to provide a disk-braking device, wherein as the car brakes, a periodic variation of a friction torque according to the present invention will be induced so as to prevent the wheels from sliding. Therefore, a preferred braking effect is presented.

To achieve above objects, the present invention provides a disk-braking device which comprises a brake disk, a brake, and a pair of friction pads installed in the brake and having a predetermined area. The two friction pads can clamp or release the brake disk for rubbing the brake disk to reduce the rotary speed or stop the rotation of the brake disk. The portion of the brake disk passing through the two friction pads has a plurality of openings having a predetermined shape and spaced with a predetermined distance. The arrangement of the openings is at the same period have different areas. The area of each opening is smaller than areas of the two friction pads.

The various objects and advantages of the present invention will be more readily understood from the following detailed description when read in conjunction with the appended drawing.

BRIEF DESCRIPTION OF THE DRAWINGS

FIG. 1 is a schematic perspective view of a prior disk-braking device.

DETAILED DESCRIPTION OF THE PREFERRED EMBODIMENTS

Figure 3:
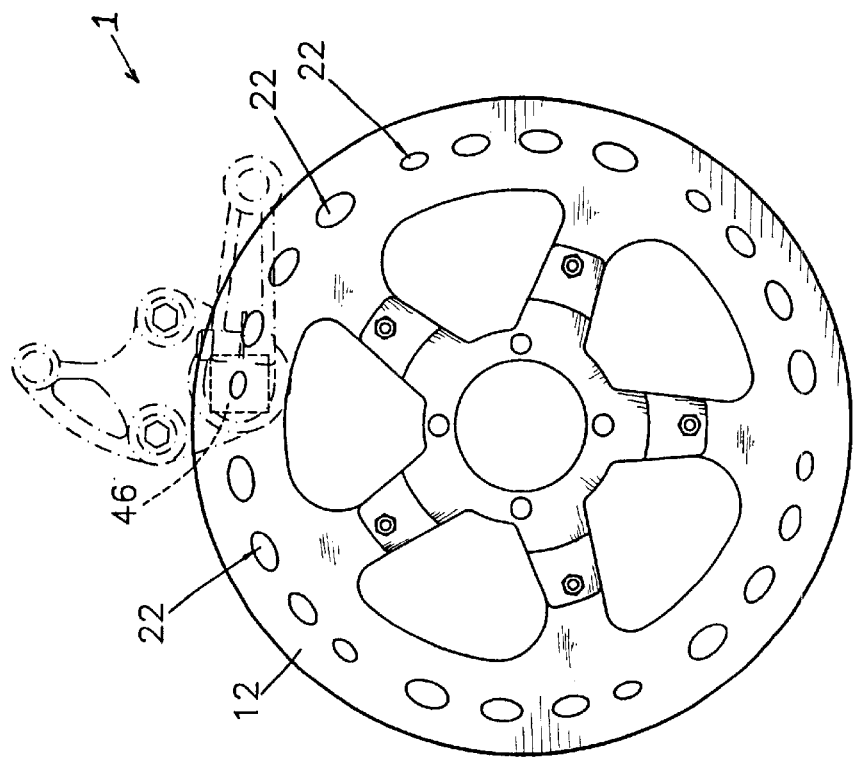
FIG. 3 is a front view of the first preferred embodiment of the present invention.
Figure 2:
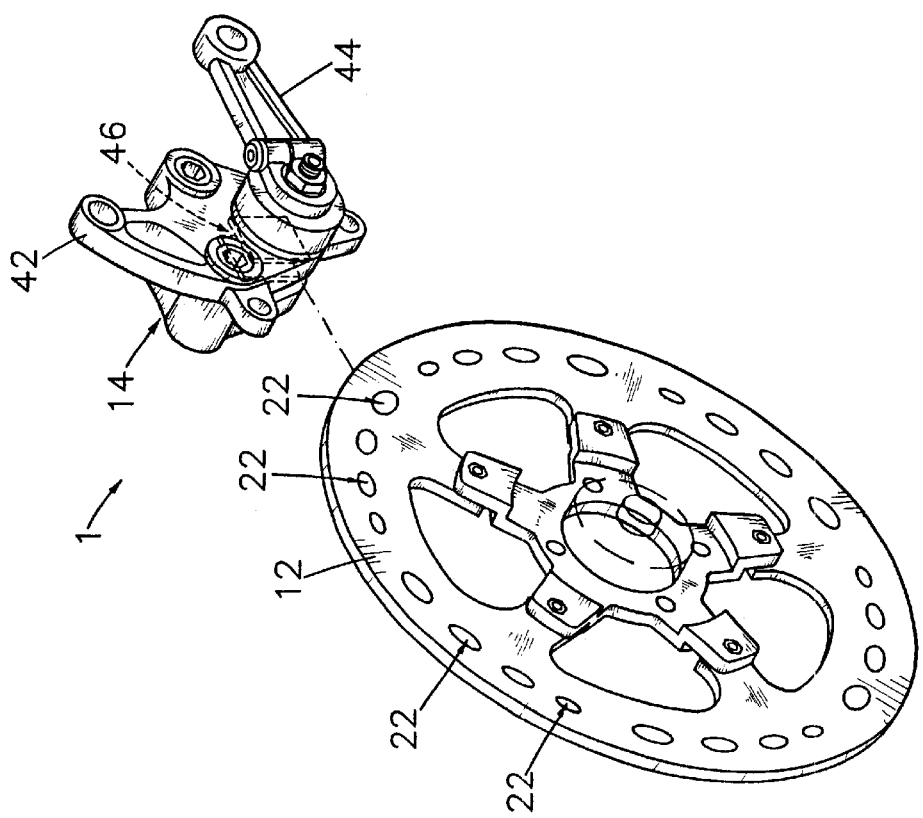
FIG. 2 is a schematic perspective view of the disk-braking piece

Referring to FIGS. 2 and 3, the disk-braking device 1 of the present invention is illustrated. The disk-braking device 1 includes a brake disk 12 and a brake 14.

The brake disk 12 is round with a predetermined thickness and radius and is coaxially firmly secured to a wheel shaft. The brake disk 12 rotates synchronously with the wheel shaft.

The brake 14 has a base 42, a movable arm 44 protruding from the base 42 and a pair of friction pads 46 which are bodies with predetermined shapes. The friction pads 46 are spaced and mirror-symmetrically installed within the base 42. A transmission means is installed between the two friction pads 46 and the arm 44 so that when the arm 44 swings, the two friction pads 46 may move reciprocally along opposite directions. The brake 14 is firmly secured to a car by a predetermined portion of the base 42 and is adjacent to the brake disk 12 so that the outer edge of the brake disk 12 is received between the two friction pads 46.

The portion (called as a friction portion) of the brake disk 12 passing through the two friction pads 46 has a plurality of openings 22 having a predetermined shape and spaced apart with a predetermined distance. The arrangement of the openings 22 is periodic. Openings 22 at the same period have different areas. The area of each opening 22 is smaller than the area of the two friction pads 46.

If the areas of the openings 22 at the same period along a clockwise direction are formed as a series $A_K$, and the area of each friction pad 46 is $A_P$, while $$A_K < A_P$$

$$A_{K-1} = r A_K, \ 0 < r < 1, K = 1, 2, 3, \ldots n$$

The number of the items (openings) =n+1

By above structure, when a car moves, as the arm 44 swings so that the two friction pads 46 approach toward and touch the brake disk 12. Then, the friction force from the brake disk 12 resists against the torque so as to prevent the wheel from rotating. Since the area of the friction portion varies periodically, the friction torque is also periodic so as to induce the effect of an anti-lock braking system (ABS).

The brake disk 12 of the present invention has the following advantages:

1. By the openings 22 at the friction portion of the brake disk 12, the friction torque can be varied easily. Moreover, the heat dissipation of the present invention is considered.

2. The openings 22 at the friction portion of the brake disk 12 provide a preferred braking effect to the manufacturers and users without increasing cost.

In above structure, the coefficient r can be set to be larger than 1 so as to generate a periodic friction torque.

Figure 4:
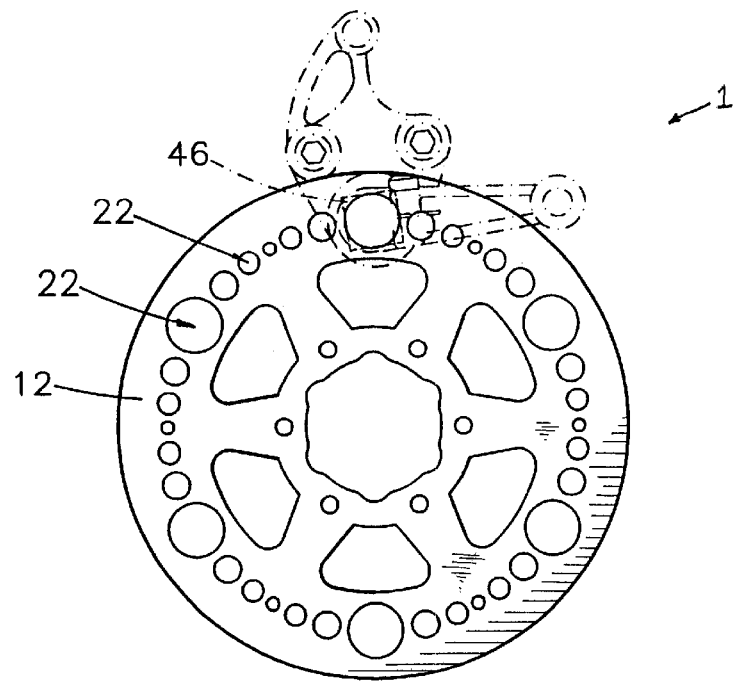
FIG. 4 is a front view of the second preferred embodiment of the present invention.

Referring to FIG. 4, another the present invention of the present invention is illustrated. In the disk-braking device 1 of this embodiment of the present invention, the areas of the openings 22 at the same period along a clockwise direction are formed as a series $A_K$, and the area of each friction pad 46 is $A_P$, while $$A_K < A_P$$

$$A_{K-1} = r A_K, \ 0 < r < 1, K = 2, 3, \ldots n$$

The number of the items (openings)=2n

In the former n+1 items, $A_{K-1}/A_K=r$, $0<r<1$

The first item of the last n−1 items is $A_{K+1}$, the last n−1 items are a series with an equal ratio of $1/r$.

Or in the former n+1 items $A_{K-1}/A_K=r$, $r>1$.

The first item of the last n−1 items is $A_{K+1}$, the last n−1 items are a series with an equal ratio of $1/r$.

Figure 5:
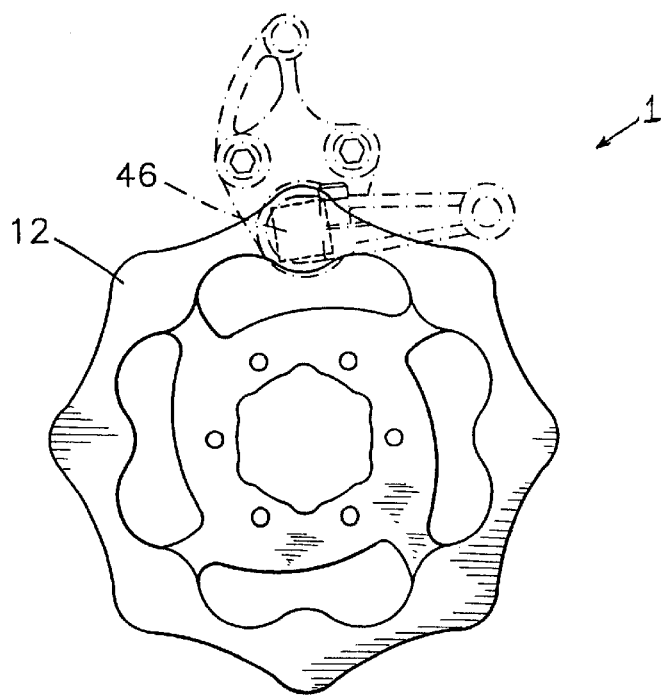
FIG. 5 is a front view of the third preferred embodiment of the present invention.

Referring to FIG. 5, in above disk-braking device 1 of the present invention, the portion (called as a friction portion) of the brake disk 12 passing through the path of the two friction pads 46 has a shape like a curve with a radius of curvature changed periodically. Only changing the friction areas of the two friction pads 46 will cause the friction torque to change continuously and periodically so as to present the mechanism of an anti-lock braking system (ABS).

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A disk-braking device for a vehicle and comprising:
   a) a brake assembly including a base having movably mounted therein at least a pair of spaced apart friction pads; and,
   b) a circular brake disk including a friction portion gripped on opposite sides by the spaced apart friction pads, the friction portion having a plurality of spaced apart openings arranged in a circular array, each opening extending through a thickness of the brake disk wherein adjacent openings in the circular array have different areas, each opening having an area smaller than areas of each friction pad, whereby an area of the friction portion varies in a circumferential direction.

2. The disk-braking device of claim 1 wherein the plurality of openings comprises:
   a) a first plurality of openings circumferentially spaced apart in the friction portion, each of the first plurality of openings having a first area; and,
   b) at least one second plurality of openings in the friction portion circumferentially spaced apart from each other and from the first plurality of openings, each of the second plurality of openings having a second area smaller than the first area.

3. The disk-braking device of claim 2 wherein the at least one second plurality of openings includes second, third and fourth pluralities of openings, each plurality of openings being circumferentially spaced apart from each other and the first plurality of openings.

4. The disk-braking device of claim 3 wherein each opening in the third plurality of openings has a third area smaller than the second area, and each opening in the fourth plurality of openings has a fourth area smaller than the third area.

5. A disk-braking device for a vehicle and comprising:
   a) a brake assembly including a base having movably mounted therein at least a pair of spaced apart friction pads; and,
   b) a brake disk including a friction portion gripped on opposite sides by the spaced apart friction pads, the friction portion having inner and outer edges both including a plurality of circumferentially spaced, concavely curved portions whereby an area-of the friction portion varies in a circumferential direction.

* * * * *